United States Patent [19]

Kishner

[11] Patent Number: 5,220,406
[45] Date of Patent: Jun. 15, 1993

[54] SAMPLE POINT INTERFEROMETER HAVING SEPARATE RIGID BODY AND FIGURE MEASUREMENT CHANNELS

[75] Inventor: Stanley J. Kishner, Pomona, N.Y.

[73] Assignee: Hughes Danbury Optical Systems, Inc., Danbury, Conn.

[21] Appl. No.: 766,683

[22] Filed: Sep. 27, 1991

[51] Int. Cl.⁵ .............................................. G01B 9/02
[52] U.S. Cl. ...................................... 356/360; 356/363
[58] Field of Search ............... 356/349, 359, 360, 363, 356/152

[56] References Cited

U.S. PATENT DOCUMENTS

| 4,022,532 | 5/1977 | Montagnino | 356/360 |
| 4,890,920 | 1/1990 | Pond et al. | 356/349 |
| 5,080,490 | 1/1992 | Manhart | 356/360 |

*Primary Examiner*—Samuel A. Turner
*Attorney, Agent, or Firm*—W. K. Denson-Low; W. J. Streeter; R. A. Hays

[57] ABSTRACT

Optical metrology apparatus includes one or more first sample point interferometers (SPIs) (16) having a wide dynamic range for measuring a rigid body position of a surface of a structure, such as a segmented mirror (11). At least one second SPI (18), having a lower dynamic range, is employed for measuring a figure of the segmented mirror. Either the first or the second SPIs may also be employed to measure a lateral displacement between the mirror segments (11a, 11b). The use of multiple SPIs, having differing dynamic ranges, within a closed-loop mirror control system is also described.

18 Claims, 4 Drawing Sheets

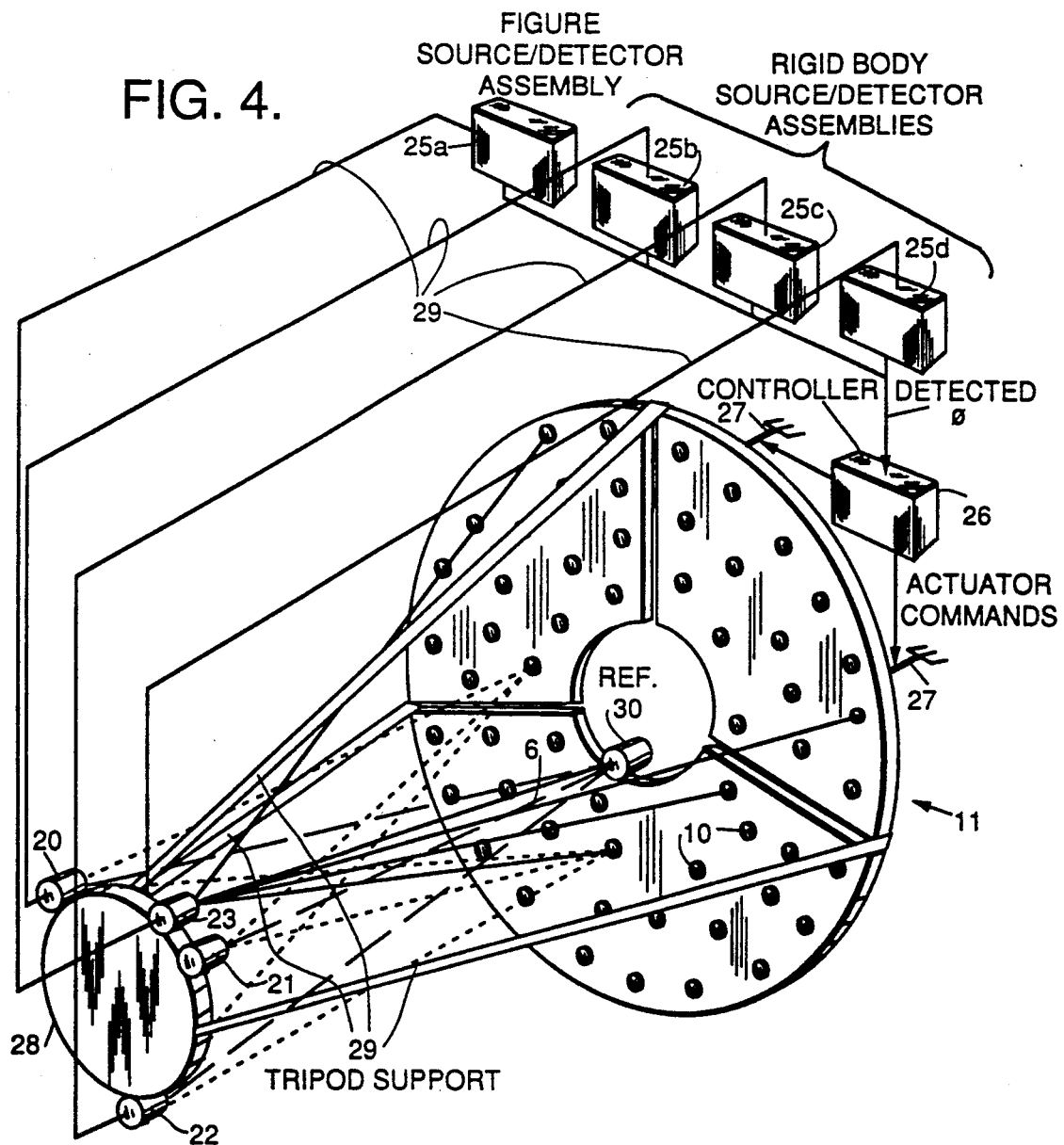

SAMPLE POINT INTERFEROMETER HAVING SEPARATE RIGID BODY AND FIGURE MEASUREMENT CHANNELS

FIELD OF THE INVENTION

This invention relates generally to optical metrology apparatus and method and, in particular, to sample point interferometers and to methods of operating same.

BACKGROUND OF THE INVENTION

In the near future, large aperture spaceborne optical systems will be required to fulfill both scientific and military applications. However, conventional telescope design approaches employing large, monolithic, rigid mirrors can be excessively heavy. Furthermore, sensitivity to thermal and mechanical disturbances increases with aperture size. Active optical system approaches offer a potential of fulfilling these requirements with less weight, and with an ability to actively correct for the effects of thermal and mechanical disturbances. Active system approaches include the use of segmented, deformable primary mirrors, as well as secondary and tertiary mirrors that are adjustable in rigid body degrees-of-freedom.

A most general design approach for the largest system element, the primary mirror, is to segment the mirror, each segment being individually deformable by means of an array of figure control actuators. However, this design approach implies an ability to accurately and rapidly measure the primary mirror's optical figure, or shape, so that the figure can be actively controlled. This entails measuring the figure of each mirror segment, as well as measuring any relative tilt and piston (phasing) errors between segments. Alignment of secondary and tertiary mirrors requires the measurement of all rigid body degrees-of-freedom (tilt, piston, decenter and roll).

However, the requirements for measuring the rigid body position of segments and the segment figure differ considerably. This can be understood by examining the causes of misalignments. Mirror segments are typically manufactured to be extremely stiff in order to accurately maintain their optical figure. Natural frequencies are high, so that mechanical disturbances that excite vibrational modes are of low amplitude, and damp out quickly. As a result, the figure is not easily influenced by mechanical disturbances.

Thermal disturbances, such as bulk temperature changes and axial temperature gradients, can significantly influence the mirror segment figure. The figure changes resulting from thermal disturbances are smooth, and change slowly with time. Measurement of the relative distances from a reference point to points on the surfaces of the segments can easily be made at a measurement rate such that changes in these relative distances, between successive measurements, are much smaller than an optical wavelength. This condition is typically satisfied with measurement rates of 1 Hz or less.

The rigid body position of mirror segments can be influenced by both thermal and mechanical disturbances. Thermal disturbances, such as in the case of mirror figure, are smooth and slow. Mechanical disturbances, however, such as those induced by spacecraft orientation or pointing, excite the structural modes of the underlying mirror segment support structures. These amplitudes are large, and vibrations require a significant period of time to damp out. Furthermore, there is no assurance that, in a large space structure, the relative rigid body positions of the mirror segments will be precisely the same both before and after a mechanical disturbance. Nonlinear effects, such as structural hysteresis, contribute to this problem. As a result, rigid body positions, as measured before and after a mechanical disturbance, can be disturbed by large amounts, and may exceed the dimensions of an optical wavelength.

In U.S. Pat. No. 4,022,532, issued May 10, 1977, entitled "Sample Point Interferometric System for Optical Figure Monitoring", L. Montagnino describes an interferometric system for monitoring an optical figure of a surface. The surface is provided at a number of points with reflective spots for reflecting a measurement beam. The reflected measurement beam is interferometrically compared with a reference beam. The disclosure of this U.S. Patent is incorporated by reference herein in its entirety.

If a Sample Point Interferometer (SPI) technique is to be used to sense the rigid body misalignments of mirror segments, it requires a capability to measure large changes in distance from one measurement to another. This large dynamic range requirement may be satisfied through the use of multiple-wavelength interferometry. However, this is a more complex technique than single-wavelength interferometry, which would be sufficient to measure only the figure of mirror segments. Furthermore, once it has been determined that the relative rigid body positions of the mirror segments are in error, rapid correction is required. This requirement then leads to a further requirement for a rapid measurement rate for measuring rigid body alignment, typically much larger than 1 Hz. The mirror figure, on the other hand, requires measurement rates that are typically much less than 1 Hz.

It is thus one object of the invention to provide an optical metrology apparatus that includes a first SPI having a wide dynamic range for measuring a rigid body characteristic of a surface of a structure, and a second SPI having a lower dynamic range for measuring a figure of the surface.

It is a further object of the invention to provide optical metrology apparatus that employs a first group of high speed, high dynamic range optical channels for measuring rigid body degrees-of-freedom of each of a plurality of mirror segments, relative to all other segments, and a second group of lower speed, lower dynamic range optical channels for measuring the optical figure of each segment.

It is another object of the invention to provide an optical metrology apparatus that includes a first SPI having a wide dynamic range for measuring a rigid body characteristic of a surface of a structure, and a second SPI having a lower dynamic range for measuring a figure of the surface, and to further employ either the first or the second SPI to also measure a lateral displacement between the mirror segments.

SUMMARY OF THE INVENTION

The foregoing and other problems are overcome and the objects of the invention are realized by a sample point interferometer that is employed to measure the rigid body characteristics and the optical figure of an active, segmented mirror assembly. The SPI measures both the rigid body degrees-of-freedom of each mirror segment, relative to all other segments, and also measures the optical figure of each segment. The invention encompasses a distributed measurement architecture in which the rigid body and figure measurement tasks are separately addressed by different subsystems having different capabilities. In that the requirements for rigid body and figure measurement differ, this novel measurement system architecture results in a substantial reduction in system complexity, with respect to a conventional approach wherein the rigid body and figure measurement tasks are accomplished in an integrated fashion.

A further object of the invention is to reduce the complexity of the sample point interferometer. In a conventional integrated approach, all system components must meet the requirements for both rigid body and figure measurement. However, in accordance with the teaching of the invention, these requirements are separated such that the rigid body measurement subsystem meets rigid body requirements only, while the figure measurement subsystem meets figure measurement requirements only. In that rigid body and figure measurement requirements differ in dynamic range and measurement rate, the use of the invention minimizes a requirement for multiwavelength interferometry, which is used for achieving large dynamic range, and also reduces a total number of high measurement rate channels, as required for rigid body measurements. Furthermore, the rigid body or the figure measurement subsystem alone can be employed to determine segment lateral displacements, thus alleviating the other subsystem from this task. Considerable savings in hardware and weight are thus achieved, which are important considerations for many applications, including space-based optical metrology systems.

BRIEF DESCRIPTION OF THE DRAWING

The above set forth and other features of the invention are made more apparent in the ensuing Detailed Description of the Invention when read in conjunction with the attached Drawing, wherein:

FIG. 4 shows three rigid body SPIs and a single figure SPI in a closed-loop configuration with a space-based controllably deformable segmented mirror.

DETAILED DESCRIPTION OF THE INVENTION

Figure 1:
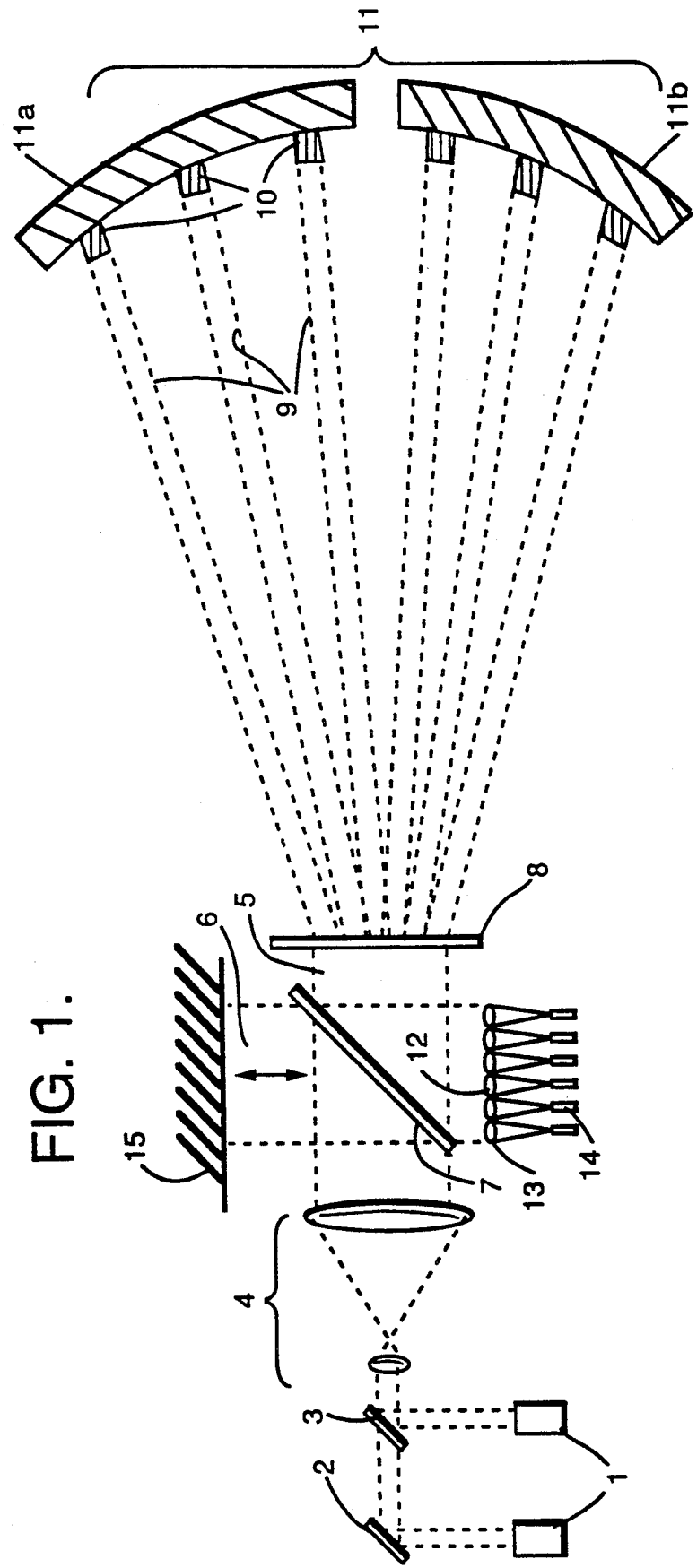
FIG. 1 is a schematic diagram of a sample point interferometer (SPI)

A schematic diagram of a Sample Point Interferometer (SPI) is shown in FIG. 1. This SPI is similar in some respects to that disclosed in the aforementioned U.S. Pat. No. 4,022,532. Generally, the system includes an interferometer, a number of light reflecting spots placed at sample points on a surface to be monitored, and a source of light for generating a reference beam of collimated light and a measuring beam of collimated light. For the SPI type described herein, using an unequal path length interferometer, the light source is a laser or other source of monochromatic light. The path length of the reference beam may either be fixed, or temporally modulated. The measuring beam is directed through focussing and/or deflecting optics which defines a field that includes the reflective spots. Light reflected back through the optics from the spots is combined with the reference beam and applied to a detector that includes a plurality of light intensity detecting elements. The detector is positioned in relation to the focussing optics so that a conjugate image of the field of reflective spots is formed at the operative surface of the detector. The separate elements of the detector are positioned to detect light reflected back from the respective spots, combined with the reference beam light. The configuration of the surface is monitored by comparing the relative intensities of the light derived from the sample points. When the reference beam path is modulated, the configuration of the surface is monitored by comparing the phase relationships of the variations in the intensity of light derived from the sample points and the variation in reference beam path length. The system is initially set so that the intensity signals from each of the detector elements are in a predetermined phase relation with the reference beam path length modulation. Any change thereafter in the phase relationships indicates distortion, i.e., movement forward or back from predetermined relative positions of the respective sample points. A change in phase indicates the direction and amount of distortion. If the surface is a deformable surface, this information may be utilized for applying force either manually or by an automatic system, at the indicated points, so to adjust the surface to a desired configuration.

More specifically, in FIG. 1 an optical source includes one or more laser devices 1, such as laser diodes, that generate one or more simultaneous wavelengths. If two or more laser devices are used, they are combined to form a collinear beam by means of a mirror 2 and beamsplitter 3. The multiple wavelength beam is enlarged and collimated with a beam expander 4 or equivalent apparatus. The collimated light is separated into a measurement, or sample beam 5, and into a reference beam 6 with a beamsplitter 7. A beam-slicer 8 is used to generate and deviate, simultaneously, a plurality of pencil beams 9 from the sample beam 5 which passes through the beam-slicer 8. The beam-slicer 8 may be implemented with an array of mirrors, prisms, or diffraction gratings. The pencil beams 9 each intercept a specified retroreflective device 10 positioned upon a surface of the structure 11, typically comprising deformable mirror segments 11a and 11b, to be measured. The retroreflective devices 10 return the pencil beams 9 to the beam-slicer 8, where the beams are again deviated such that they are mutually parallel, in a direction opposite to the original sample beam 5. Reflecting from the beamsplitter 7, each reflected pencil beam is captured by one lenslet 12 of a lenslet array 13. The lenslets 12 form images of the retroreflective devices 10 on an array of photodetectors 14. These images interfere with the reference beam 6, after the reference beam is reflected from a reflective or retroreflective device 15. The photodetectors 14 are employed to determine the relative distances from the beam slicer 8 to the retroreflective devices 10, from which the characteristics of the structure 11 are determinable by known methods. Alternatively, the reflective device 15 may be coupled to an actuator (not shown) and is displaced along the direction of the reference beam 6, thereby modulating the reference beam path length, and therefore the intensities of the interference measured by the photodetectors 14. Various other means of modulating the reference beam pathlength may be used, such as the introduction of moving refractive or polarizing elements or the placement of electronic or acousto-optic elements into the reference beam. Measurement of the electrical phase of these modulated intensities is employed to determine the relative distances from the beam-slicer 8 to the retroreflective devices 10.

The SPI configuration shown in FIG. 1, exclusive of the mirror segments 11 and surface reflectors, may be referred to as an "optical head". In FIG. 1 the optical head measures all retroreflective devices 10 simultaneously, and, therefore, also the rigid body relationship of segments 11a and 11b, and also the shape or optical figure of the segments. As such, the system of FIG. 1 may be referred to as an "integrated" system.

Figure 2:
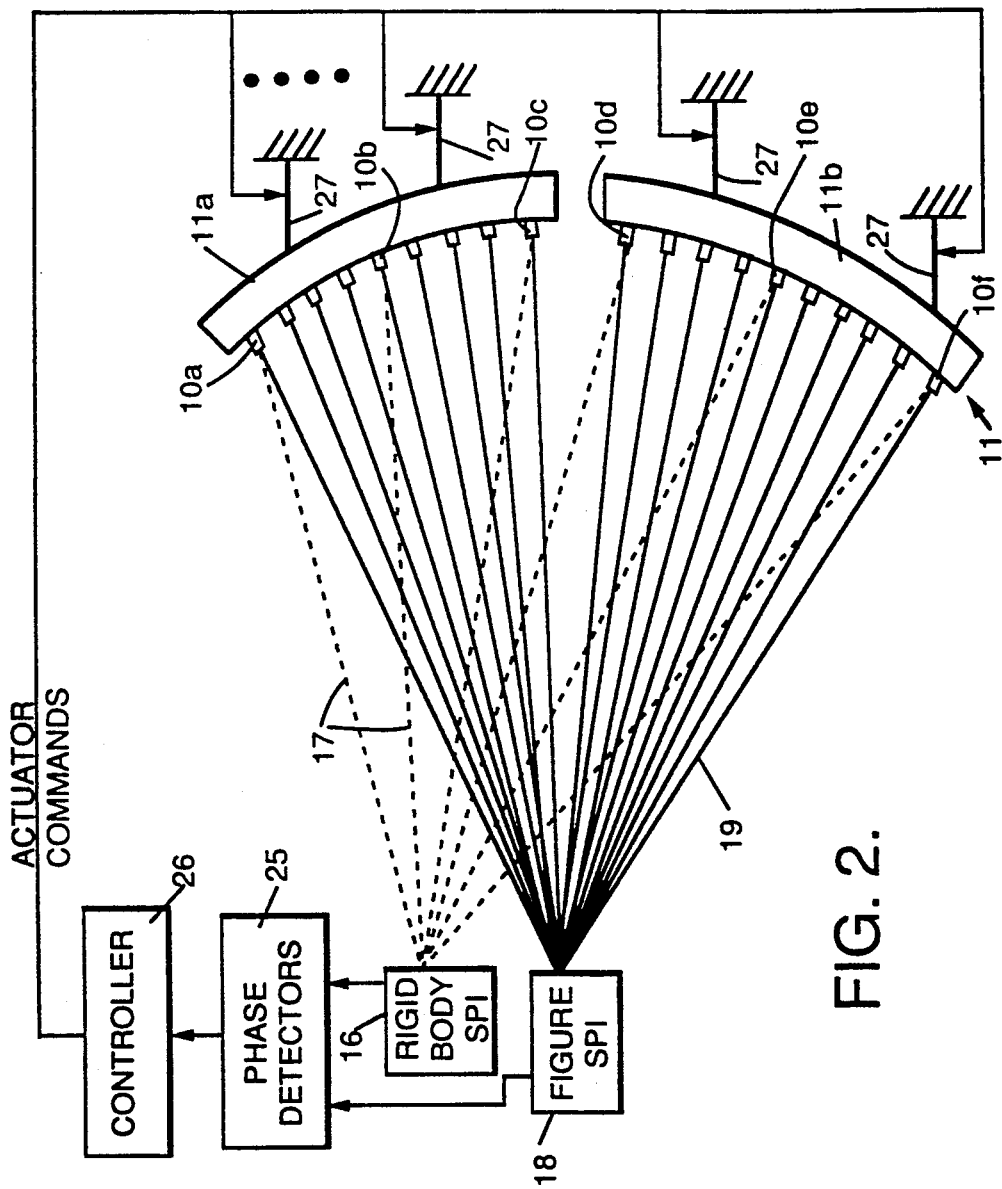
FIG. 2 illustrates a rigid body SPI and a separate figure SPI being used in conjunction with a segmented mirror.

In accordance with the invention, FIG. 2 illustrates a non-integrated SPI embodiment in which the rigid body position and figure measurement functions are separated. A rigid body measurement optical head 16 generates pencil beams 17 (shown dotted) which are directed to retroreflective devices 10 affixed to deformable mirror segments 11a and 11b. The rigid body optical head 16 measures three retroreflective devices on each of the segments (10a, 10b, 10c, 10d, 10e, 10f). Each group of three retroreflective devices are preferably disposed in a triangular arrangement on the front surface of the mirror, and would not be collinear, as indicated in FIG. 2. It is assumed, in FIG. 2, that lateral motion of the mirror segments 11 is not significant, and therefore three distance measurements are sufficient to measure axial displacement ("piston") and tilt in two degrees-of-freedom. Thus, for the two mirror segments 11 shown, the rigid body SPI head 16 has six channels, all operating at multiple wavelengths and at a high measurement rate (>1 Hz).

As an example, optical wavelengths of 785 nm and 828 nm are employed so as to generate, by known techniques, a longer synthetic wavelength ($\Lambda$) in accordance with the expression:

$$\Lambda = \lambda_1 \lambda_2 / (\lambda_2 - \lambda_1).$$

In this example $\Lambda$ equals 15.1 micrometers. The synthetic wavelength is used in conjunction with one or more optical wavelengths to unambiguously measure object displacements that exceed one quarter of an optical wavelength, as is typical for rigid body position displacements.

The measurement rate for the rigid body subsystem is application dependent. A typical value is 10 Hz.

Further in accordance with the invention, a figure measurement SPI head 18 generates a sufficient number of pencil beams 19 (shown solid) to address most retroreflective devices 10 on the deformable, segmented mirror 11. FIG. 2 shows, for illustrative purposes, a total of eighteen channels, six of which measure the same or closely-adjacent retroreflective devices as the rigid body SPI head 16, although measurement of the same retroreflectors is not required. Each of these figure channels operates at a single wavelength, and at a relatively low measurement rate (<1 Hz). As an example, a measurement rate of 0.1 Hz may be deemed sufficient for a given application.

It can be appreciated that a single integrated optical SPI head, such as that disclosed in FIG. 1, would require eighteen multiple-wavelength, high measurement rate channels to duplicate the functionality of the embodiment of FIG. 2. As a result, the conventional integrated approach requires a configuration that is considerably more complex than that depicted in FIG. 2.

Figure 3:
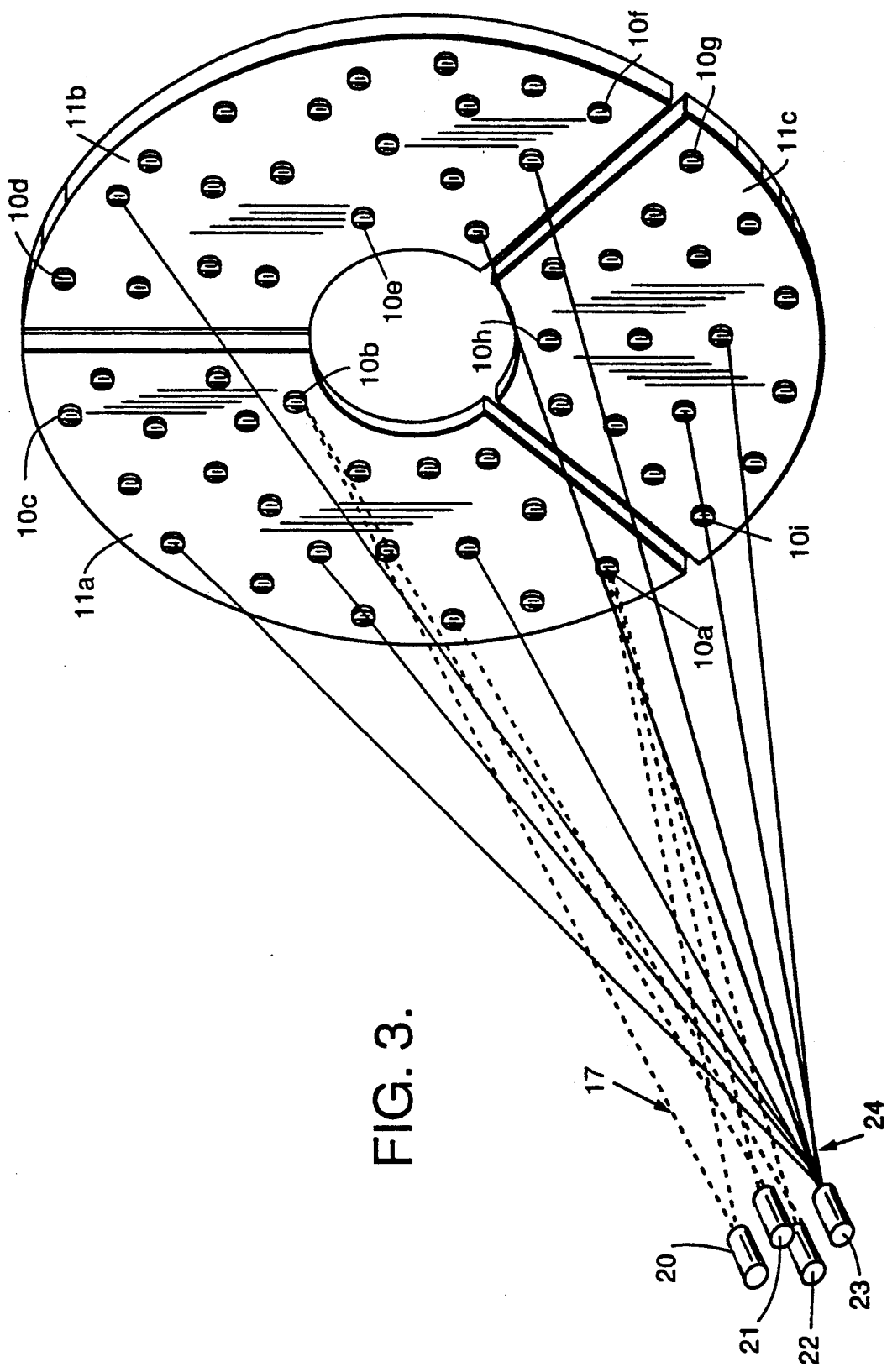
FIG. 3 illustrates a plurality of rigid body SPIs and a single figure SPI being used in conjunction with a segmented mirror, wherein the plurality of rigid body SPIs are arranged for determining a lateral displacement of the mirror segments.

FIG. 3 illustrates an embodiment of the invention for use in the case in which lateral segment motion is significant, and is required to be included within the measurement through the use of parallax techniques. In FIG. 3, three separate rigid body optical heads 20, 21, 22 are separated from one other, nominally in a triangular arrangement, to achieve the required parallax. Each rigid body head 20, 21, 22 addresses pencil beams 17 (shown dotted, not all are shown) to three retroreflective devices (shown solid) on each mirror segment 11. The three rigid body optical heads 20, 21, 22 address the same set of retroreflective devices (10a-10i) on each segment, or sets of three retroreflective devices that are closely disposed to one another. Through the use of the three optical heads 20, 21, 22, and three retroreflective devices per segment, all six rigid body degrees-of-freedom of each segment may be determined. The rigid body heads 20, 21, 22 all use multiple-wavelength interferometry, and operate at relatively high measurement rates. A single figure measurement head 23 directs pencil beams 24 (beams shown solid; not all beams are shown) to most retroreflective devices on the mirror segments 11a, 11b, 11c. By example only, nine of these retroreflective devices (10a-10i) are the same as those measured by the rigid body heads 20, 21, 22, or they may be separate retroreflective devices that are closely-spaced to those addressed by the rigid body heads 20, 21,22. All channels in the figure measurement optical head 23 use single wavelength interferometry, and operate at relatively low measurement rates. For a case where there are many mirror segments, it is within the scope of the invention to replace the single figure measurement head 23 with a plurality of heads, one for each of the mirror segments. The same total number of channels is used, and the same advantages that accrue to the use of the single figure measurement optical head 23 still apply.

It is within the scope of the invention to instead employ multiple ones of the figure measurement heads 23, disposed to achieve the necessary parallax, to make the lateral displacement determination.

In the configuration depicted in FIG. 3, where parallax measurements are required, the use of the invention reduces complexity to a larger degree than when parallax is not required. When compared to an integrated approach, wherein three optical heads measure both mirror rigid body and figure, a considerable savings in system complexity is realized.

It is within the scope of the invention to employ the measurements of figure and rigid body position within a closed-loop mirror control system. As is illustrated in FIG. 2, the output of the rigid body SPIs 16 and the figure SPI 18 is provided to a phase detector 25. The phase-modulated signals may be processed by one of a number of phase demodulation techniques. Suitable examples include a technique disclosed by Wyant, J. and Koliopoulos, C., "Phase Measurement Systems for Adaptive Optics," *Special Topics in Optical Propagation, AGARD Conference Proceedings*, No. 300, pp. 48/1-2 (1981) and a technique disclosed by Sasaki, I., Okazaki, H. and Sakai, M., "Sinusoidal Phase Modulating Interferometer using the Integrating-Bucket Method," *Applied Optics*, Vol. 26 (6) pp. 1089-1093 (1987). The processed signals provide a result that is proportional to mirror displacement. After being suitably scaled by a controller 26, the controller 26 generates actuator commands for controllably driving a plurality of mirror actuators 27, such as voice coils, piezoelectric transducers, or stepper motors, only a few of which are shown in FIG. 2.

Referring now to FIG. 4 there is illustrated the use of the invention in a space-based, closed-loop deformable mirror control system. A segmented primary mirror 11 is provided with a plurality of retroreflectors 10. Because of their relatively small size, and the fact that the retroreflectors 10 cover a very small percent of the mirror 11 area, their effect on the imaging performance is negligible. The array of retroreflectors are addressed by, in accordance with the invention, the figure SPI head 23 and by the rigid body heads 20, 21, 22. The rigid body SPI heads 20, 21, 22 are disposed at, by example, 120° intervals about a secondary mirror support structure 28, which also supports the figure SPI head 23. In FIG. 4 the pencil beams generated and received by the rigid body SPI heads 20, 21, 22 are shown as dashed lines while the pencil beams generated and received by the figure SPI head 23 are shown as solid lines. A tripod support structure 29 couples the secondary mirror support structure 28 in a fixed relationship to the primary mirror 11. In the embodiment shown in FIG. 4 the source/detector components of each of the SPI heads is separately provided within an associated source/detector assembly 25a-25d. Each of these assemblies is connected to its associated SPI head through fiber optic cables 29. A single mode fiber may be used to provide the laser illumination to the SPI head, and multimode fibers may be used to convey the optical signals from the SPI heads to the photodetectors 14 and associated electronics located within the source/detector assemblies 25a-25d. An advantage of providing the source/detector assemblies 25a-25d at a remote location is that the size and weight of each SPI head is reduced, which is an important consideration when mounting the SPI heads adjacent to a mirror structure. Further in this regard, in addition to the retroreflectors 10 provided on the surfaces of the primary mirror 11 segments, a single reference retroreflector 30 may be mounted in the immediate vicinity of the primary mirror 11, such as at a position within the obscuration of the primary mirror 11. This differs from the embodiment shown in FIG. 1 wherein the reference mirror 15 is provided within the SPI. An advantage of providing the single reference retroreflector 30 as shown is that reference beams projected toward this common retroreflector have path lengths that are much more closely matched to the plurality of sample beam path lengths. This tends to relax laser frequency stability requirements. A further advantage of providing the reference retroreflector 30 at the mirror 11 is that a further reduction in the size and weight of each SPI head is achieved. Phase modulation of each of the reference beams 6 is accomplished by providing a suitable phase modulator, such as a piezoelectric actuator, at the reference retroreflector 30. For this embodiment, the SPI head of FIG. 1 is modified to provide a reflector in the path of the reference beam 6 for directing the reference beam to the common reference retroreflector 30. The SPIs 20-23 operate as described above to separately measure the rigid body position and figure of each of the mirror 11 segments. Based on this information the controller 26 generates actuator commands for controlling, via mirror actuators 27, the figure of the mirror segments and their rigid body alignment.

Although described herein in the context of an unequal path length interferometer, it should be understood that the teaching of the invention may also be realized with an equal path length interferometer. Also, it is within the scope of the invention to blanket illuminate the mirror segments, thereby eliminating the beamslicer 8. That is, it is within the scope of the invention to illuminate the entire surface of interest, as is done in the above mentioned U.S. Pat. No. 4,022,532. For this case, the system is still considered to use a plurality of sample beams, in that it is the radiation directed to and reflected from the retroreflectors 10 that is of importance. Furthermore, the teaching of the invention may be applied to other than the measurement of segmented mirrors or the measurement of space-based structures.

Thus, while the invention has been particularly shown and described with respect to preferred embodiments thereof, it will be understood by those skilled in the art that changes in form and details may be made therein without departing from the scope and spirit of the invention.

What is claimed is:

1. Optical metrology apparatus for measuring a rigid body position and a shape of a surface associated with a structure, comprising:

one or more first sample point interferometer means having a first dynamic range and operating to project illumination to and receive sample beams reflecting from a surface so as to determine a rigid body position associated with the surface; and one or more second sample point interferometer means having a second dynamic range that is less than the first dynamic range and operating to project illumination to and receive sample beams reflecting from the surface so as to determine a shape of the surface.

2. Optical metrology apparatus as set forth in claim 1 and further including means, having a first input coupled to an output of said first sample point interferometer means and a second input coupled to an output of said second sample point interferometer means, for determining a correction for the surface so as to cause the surface to conform to a desired rigid body position and shape, said determining means having an output coupled to means for varying the rigid body position and shape of the surface in accordance with the determined correction.

3. Optical metrology apparatus as set forth in claim 1 wherein the surface is partitioned into a plurality of segments, and wherein said one or more first sample point interferometer means determines a rigid body position of each of the surface segments, and wherein said one or more second sample point interferometer means determines a shape of each of the surface segments.

4. Optical metrology apparatus for measuring a rigid body position and a figure of a surface associated with a structure, comprising:

first sample point interferometer means, including means for simultaneously directing a plurality of first sample beams to and for simultaneously receiving a plurality of reflected first sample beams from a surface of the structure, said first sample point interferometer means including means for providing said first plurality of sample beams at a plurality of wavelengths for interferometrically determining, with regard to a first reference beam, a rigid body position of the surface; and second sample point interferometer means, including means for simultaneously directing a second plurality of sample beams to and for simultaneously receiving a plurality of reflected second sample beams from the surface of the structure, said second sample point interferometer means including means for providing said second plurality of sample beams at a single wavelength for interferometrically determining, with respect to a second reference beam, a figure characteristic of the surface.

5. Optical metrology apparatus as set forth in claim 4 wherein said first and said second providing means each include at least one laser source means for simultaneously generating one or more wavelengths.

6. Optical metrology apparatus as set forth in claim 4 wherein the surface of the structure is segmented into a plurality of surfaces, and wherein said first sample point interferometer means is comprised of a plurality of said first sample point interferometer means disposed in a predetermined spatial relationship one to another so as to each simultaneously direct a plurality of said first sample beams to each of the surfaces of each of the segments and to each simultaneously receive a plurality of reflected first sample beams from each of the surfaces of each of the segments for interferometrically determining an amount of lateral displacement between the surfaces.

7. Optical metrology apparatus as set forth in claim 4 wherein the first plurality of sample beams is less than the second plurality of sample beams.

8. Optical metrology apparatus as set forth in claim 6 wherein the first plurality of sample beams is less than the second plurality of sample beams.

9. Optical metrology apparatus as set forth in claim 4 wherein the surface is provided with a plurality of reflective regions for reflecting the sample beams therefrom, and wherein at least some of the first and the second sample beams are directed to a same one of the reflective regions.

10. Optical metrology apparatus as set forth in claim 4 wherein each of said first and said second sample point interferometer means includes means for phase modulating the associated reference beam.

11. Optical metrology apparatus as set forth in claim 4 wherein each of said first and said second reference beams are phase modulated by a single phase modulator.

12. An optical metrology system, comprising:
a segmented mirror having a plurality of retroreflective regions disposed upon a surface of interest of each of the segments;
a plurality of first sample point interferometer means having a first dynamic range and operating to project (N) sample beams to and receive (N) sample beams reflecting from retroreflective regions disposed upon each of the surfaces so as to determine rigid body positions of the mirror segments;
at least one second sample point interferometer means having a second dynamic range that is less than the first dynamic range and operating to project (M) sample beams to and receive (M) sample beams reflecting from retroreflective regions disposed upon each of the surfaces so as to determine a figure of the segmented mirror, wherein (M>N); and
means, having a first input coupled to an output of each of said plurality of first sample point interferometer means and a second input coupled to an output of said at least one second sample point interferometer means, for determining a correction to be applied to the segmented mirror so as to cause the segmented mirror to conform to a desired rigid body position and to a desired shape, said determining means having an output coupled to means for varying the rigid body position and shape of the segmented mirror in accordance with the determined correction.

13. An optical metrology system as set forth in claim 12 wherein said plurality of first sample point interferometer means operate with two or more wavelengths, and wherein said at least one second sample point interferometer means operates with a single wavelength.

14. An optical metrology system as set forth in claim 12 and further including a phase modulator means disposed in the vicinity of said segmented mirror for phase modulating a reference beam associated with each of said first and said second sample point interferometer means.

15. An optical metrology system as set forth in claim 12 and further including a phase modulator means disposed at an obscuration of said segmented mirror for phase modulating a reference beam associated with each of said first and said second sample point interferometer means.

16. An optical metrology system as set forth in claim 12 wherein said segmented mirror is a primary mirror, and wherein each of said first and said second sample point interferometer means is disposed in proximity to a secondary mirror that is optically coupled to the primary mirror.

17. An optical metrology system as set forth in claim 12 wherein said plurality of first sample point interferometer means determine the rigid body position a plurality of times per second, and wherein said at least one second sample point interferometer means determines the figure at a rate that is less than that of said plurality of first sample point interferometer means.

18. An optical metrology system as set forth in claim 12 wherein said segmented mirror is attached to a spacecraft.

* * * * *